US012803878B2

(12) United States Patent
Sadok et al.

(10) Patent No.: US 12,803,878 B2
(45) Date of Patent: Nov. 17, 2026

(54) METHOD TO EFFICIENTLY UPDATE INFORMATION REGARDING NETWORK INFRASTRUCTURE

(71) Applicant: TELEFONAKTIEBOLAGET LM ERICSSON (PUBL), Stockholm (SE)

(72) Inventors: Djamel Sadok, Jaboatão dos Guararapes (BR); Patricia Takako Endo, Recife (BR); Judith Kelner, Jaboatão dos Guararapes (BR); Elisson Rocha, Recife (BR); Guto Leoni, Summerhill (IE); Maria Valéria Marquezini, Indaiatuba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/123,428

(22) PCT Filed: May 26, 2023

(86) PCT No.: PCT/IB2023/055447

§ 371 (c)(1),
(2) Date: Apr. 23, 2025

(87) PCT Pub. No.: WO2024/089474

PCT Pub. Date: May 2, 2024

(65) Prior Publication Data

US 2026/0156038 A1 Jun. 4, 2026

Related U.S. Application Data

(60) Provisional application No. 63/381,386, filed on Oct. 28, 2022, provisional application No. 63/381,504, filed on Oct. 28, 2022.

(51) Int. Cl.
*H04L 41/12* (2022.01)
*H04L 45/02* (2022.01)

(52) U.S. Cl.
CPC .............. *H04L 41/12* (2013.01); *H04L 45/02* (2013.01)

(58) Field of Classification Search
CPC ................................ H04L 41/12; H04L 45/02
See application file for complete search history.

(56) References Cited

U.S. PATENT DOCUMENTS

2007/0133530 A1 6/2007 Previdi et al.
2009/0180400 A1* 7/2009 Chiabaut ................ H04L 12/18 370/255

(Continued)

FOREIGN PATENT DOCUMENTS

KR 20190108255 A 9/2019

OTHER PUBLICATIONS

Barroso, L. A., et al., The datacenter as a computer, Designing warehouse-scale machines. Third Edition, Synthesis Lectures on Computer Architecture #46, Margaret Martonosi, Editor, Morgan & Claypool; 3rd edition (Oct. 29, 2018), 209 Pages.

(Continued)

*Primary Examiner* — Kostas J Katsikis
(74) *Attorney, Agent, or Firm* — Ericsson Inc.

(57) ABSTRACT

A computer-implemented method is disclosed to efficiently update information regarding a network. The method includes a preprocessing stage, a first processing stage, and a second processing stage. The first processing stage involves updating a graph to reflect the change to the state of the network, determining paths that are potentially affected by the change to the state of the network, determining whether to postpone recalculation of any of the potentially affected paths until the second processing stage, logging information regarding those of the potentially affected paths for which recalculation is to be postponed, and recalculating any of the potentially affected paths for (Continued)

which recalculation is not to be postponed. The second processing stage involves recalculating, based on accessing the logged information, those of the potentially affected paths for which recalculation was postponed in response to determining that the full reprocessing is not to be performed.

20 Claims, 7 Drawing Sheets

(56) References Cited

U.S. PATENT DOCUMENTS

| | | | | |
|---|---|---|---|---|
| 2015/0200803 | A1 | 7/2015 | Kashyap et al. | |
| 2017/0201451 | A1* | 7/2017 | Allan | H04L 12/185 |
| 2017/0207967 | A1* | 7/2017 | Thubert | H04L 12/44 |

OTHER PUBLICATIONS

Bond, A., et al., "Sport prosumer networks: exploring prosumption value in Twitter conversations during COVID-19". Managing Sport and Leisure, Accepted, Jul. 30, 2021, 19 Pages.
Chen, et al: "Adaptive multi-resolution Modularity for detecting communities in networks". Physica A: Statistical Mechanics and Its Applications vol. 491, Feb. 1, 2018, pp. 591-603. (Abstract Only).
Clauset, A., et al: "Finding community structure in very large networks", arXiv:cond-mat/0408187v2 [cond-mat.stat-mech] Aug. 30, 2004, 6 Pages.
Elmokashfi, A., et al., "On the Scalability of BGP: The Role of Topology Growth", IEEE Journal on Selected Areas in Communications (vol. 28, Issue: 8, Oct. 2010), Sep. 27, 2010, 12 Pages.
Fan, J., et al., "Availability-aware Mapping of Service Function Chains", IEEE INFOCOM 2017—IEEE Conference on Computer Communications, May 1-4, 2017, 12 Pages.
Gao, J., et al., "Shortest Path Computing in Relational DBMSs," IEEE Transactions on Knowledge and Data Engineering, Feb. 2013, vol. 26, No. 4, 15 Pages.
Goldberg, A., et al.: "Computing the shortest path: A* search meets graph theory", SODA '05: Proceedings of the sixteenth annual ACM-SIAM symposium on Discrete algorithms, Jan. 23, 2005, 10 Pages.
Hagberg, A., et al., "Exploring Network Structure, Dynamics, and Function using NetworkX", Proceedings of the 7th Python in Science Conference (SciPy 2008), Jun. 2008, 6 pages.
Karmizadeh-Farshbafan, M., et al., "A Dynamic Reliability-Aware Service Placement for Network Function Virtualization (NFV)", IEEE Journal on Selected Areas in Communications, vol. 38, No. 2, Feb. 2020, 16 Pages.
Lange, S., et al., "Machine Learning-based Prediction of VNF Deployment Decisions in Dynamic Networks", 2019 20th Asia-Pacific Network Operations and Management Symposium (APNOMS), Sep. 18-20, 2019, 6 Pages.
Li, et al: "Adaptive service function chaining mappings in 5G using deep Q-learning". Computer Communications vol. 152, Feb. 15, 2020, pp. 305-315. (Abstract Only).
Li, S., et al., "5G Internet of Things: A Survey", Journal of Industrial Information Integration, Jan. 31, 2018, 28 Pages.
Liu, X., et al., "An NVM SSD-Based High Performance Query Processing Framework for Search Engines", IEEE Transactions on Knowledge and Data Engineering, vol. 35, No. 6, Jun. 2023, 14 Pages.
Mijumbi, R., et al., "Network Function Virtualization: State-of-the-art and Research Challenges", IEEE Communications Surveys & Tutorials (vol. 18, Issue: 1, Firstquarter 2016), Sep. 4, 2015, 28 Pages.
Nguyen, K., et al, "Joint Node-Link Embedding Algorithm based on Genetic Algorithm in Virtualization Environment", 2021 IEEE 94th Vehicular Technology Conference (VTC2021-Fall), Sep. 27-30, 2021, 5 Pages.
Pei, J., et al., "Two-Phase Virtual Network Function Selection and Chaining Algorithm Based on Deep Learning in SDN/NFV-Enabled Networks", IEEE Journal on Selected Areas in Communications (vol. 38, Issue: 6, Jun. 2020), Apr. 13, 2020, 16 Pages.
Sahhaf, S., et al., "Scalable Architecture for Service Function Chain Orchestration", 2015 Fourth European Workshop on Software Defined Networks, Sep. 30, 2015-Oct. 2, 2015, 6 Pages.
Santos, G.L., et al., "A reinforcement learning-based approach for availability-aware service function chain placement in large-scale networks", Future Generation Computer Systems 136 (2022) 93-109, Accepted May 28, 2022, Available online Jun. 6, 2022, 17 Pages.
Schwartz, B., et al., "High Performance MySQL: Optimization, Backups, and Replication", Third Edition, Published by O'Reilly Media, Inc., Mar. 2012, 826 Pages.
Shah, H., et al., "Multiagent Deep-Reinforcement-Learning-Based Virtual Resource Allocation Through Network Function Virtualization in Internet of Things", IEEE Internet of Things Journal (vol. 8, Issue: 5, Mar. 1, 2021), Sep. 8, 2020, 12 Pages.
Souza, R., et al.: "Importance Measures for NFV Data Center: An Availability Evaluation", 2018: Proceedings of the V Pre-IETF Workshop, Jul. 26, 2018, 14 Pages.
Srihari, S, et al., "A Framework for SQL-Based Mining of Large Graphs on Relational Databases", Pacific-Asia Conference on Knowledge Discovery and Data Mining, Part of the Lecture Notes in Computer Science book series (LNAI, vol. 6119), Jun. 21, 2010, 6 Pages, Springer. (Abstract).
Sun, G., et al., "Online Parallelized Service Function Chain Orchestration in Data Center Networks", IEEE Access, Received Jun. 26, 2019, accepted Jul. 17, 2019, date of publication Jul. 22, 2019, date of current version Aug. 8, 2019, vol. 7, 15 Pages.
Sun, G., et al., "Service Function Chain Orchestration Across Multiple Domains: A Full Mesh Aggregation Approach", IEEE Transactions on Network and Service Management (vol. 15, Issue: 3, Sep. 2018), Jul. 31, 2018, 17 Pages.
Tsirakis, C., et al: "Load balancing in 5G Networks", MATEC Web of Conferences 125, 03010 (2017), CSCC 2017, Jan. 2017, 6 Pages.
Zhao, K., et al., "All-in-One: Graph Processing in RDBMSs Revisited", SIGMOD '17: Proceedings of the 2017 ACM International Conference on Management of Data, May 9, 2017, 16 Pages.
Zhao, K., et al., "Graph Processing in RDBMSs", Bulletin of the IEEE Computer Society Technical Committee on Data Engineering Sep. 2017, 12 Pages.
Zhao, K., et al., "SQL-G: Efficient Graph Analytics by SQL", IEEE Transactions on Knowledge and Data Engineering, (vol. 33, Issue: 5, May 1, 2021), Oct. 31, 2019, pp. 2237-2251.

* cited by examiner

METHOD TO EFFICIENTLY UPDATE INFORMATION REGARDING NETWORK INFRASTRUCTURE

CROSS-REFERENCE TO RELATED APPLICATIONS

This application claims the benefit of U.S. Provisional Application No. 63/381,386, and U.S. Provisional Application No. 63/381,504, both filed Oct. 28, 2022, which are hereby incorporated by reference. This application is a 371 of International Application No. PCT/IB2023/055447, filed on May 26, 2023, the disclosure of which is fully incorporated herein by reference.

TECHNICAL FIELD

Embodiments of the invention relate to the field of computer networks, and more specifically, to efficiently updating information regarding a network infrastructure.

BACKGROUND

Network functions virtualization (NFV) is a network architecture concept that leverages virtualization technologies to virtualize entire classes of network node functions into building blocks that may connect or be chained together to provide communication services. NFV may be realized using virtualized network functions (VNFs). A VNF is implemented by one or more virtual machines or containers running on top of commercial off the shelf (COTS) servers, switches, and/or storage devices, or in a cloud computing infrastructure. This is in contrast to the traditional approach of having custom/dedicated hardware appliances for each network function. The decoupling of the network function software from the underlying hardware provides a flexible network architecture that allows for agile network management and fast service roll outs with significant reduction in capital expenditure (CAPEX) and operating expenses (OPEX). A service function chain (SFC) may consist of one or more VNFs connected together in a particular order to provide an end-to-end service.

A SFC placement algorithm may be used to determine where in the network SFCs should be placed. A SFC placement algorithm should place a SFC in a network in a manner that ensures that the quality of service (QoS) requirements of the service provided by the SFC are being met. To find an optimal placement for a SFC, the SFC placement algorithm needs to have access to information regarding the network such as the topology of the network (e.g., the network nodes and network links included in the network) and the amount of resources available at the network nodes and network links in the network. Such network information is often stored in a database such as a relational database (e.g., due to the need to maintain compatibility with existing software products such as network and server management software). The network and its resources may be modeled using a graph data structure (e.g., undirected graph), sometimes referred to as a resource graph. The network information that is stored in the database can become very large, particularly for large networks such as datacenter networks, which often include hundreds or even thousands of interconnected network nodes. Also, the network information has to be updated as the state of the network changes (e.g., change in topology and/or change in the amount of available resources). However, databases such as relational databases do not perform well when retrieving and manipulating large volumes of data. Also, the entire resource graph of the network has to be loaded into memory to execute queries and make decisions. When there is limited memory (e.g., random access memory (RAM)), the entire resource graph may not fit in memory, which may increase the number of required disk input/output (I/O) operations (e.g., to load parts of the resource graph from disk to memory and out of memory). As a result, updating the network information in the database can take a long time, which may make it difficult for the SFC placement algorithm (which relies on having access to the network information) to find a SFC placement solution in a timely manner.

SUMMARY

A method is disclosed for efficiently updating information regarding a network. The method involves a preprocessing stage, a first processing stage, and a second processing stage. The preprocessing stage involves generating a graph representing the resources of the network, wherein each node in the graph represents a network node and each link in the graph represents a network link, grouping nodes in the graph into a plurality of clusters, wherein each of the plurality of clusters includes one or more gateway node(s) representing the cluster, and calculating intra-cluster paths and inter-cluster paths, wherein the intra-cluster paths include paths between nodes belonging to a given cluster and the inter-cluster paths include paths between gateway nodes belonging to different clusters. The first stage involves detecting a change to the state of the network, responsive to detecting that the change to the state of the network, updating the graph to reflect the change to the state of the network, determining paths that are potentially affected by the change to the state of the network, determining whether to postpone recalculation of any of the potentially affected paths until a second processing stage, logging information regarding those of the potentially affected paths for which recalculation is to be postponed, and recalculating any of the potentially affected paths for which recalculation is not to be postponed. The second stage involves determining whether full reprocessing is to be performed and responsive to determining that the full reprocessing is not to be performed, recalculating, based on accessing the logged information, those of the potentially affected paths for which recalculation was postponed.

A non-transitory machine-readable medium is disclosed that provides instructions that, if executed by one or more processors of one or more computing devices, will cause said one or more computing devices to perform operations for efficiently updating information regarding a network. The operations involve a preprocessing stage, a first processing stage, and a second processing stage. The preprocessing stage involves generating a graph representing the resources of the network, wherein each node in the graph represents a network node and each link in the graph represents a network link, grouping nodes in the graph into a plurality of clusters, wherein each of the plurality of clusters includes one or more gateway node(s) representing the cluster, and calculating intra-cluster paths and inter-cluster paths, wherein the intra-cluster paths include paths between nodes belonging to a given cluster and the inter-cluster paths include paths between gateway nodes belonging to different clusters. The first stage involves detecting a change to the state of the network, responsive to detecting that the change to the state of the network, updating the graph to reflect the change to the state of the network, determining paths that are potentially affected by the change to the state of the network, determining whether to postpone recalculation of any of the potentially affected paths until a second processing stage, logging information regarding those of the potentially affected paths for which recalculation is to be postponed, and recalculating any of the potentially affected paths for which recalculation is not to be postponed. The second stage involves determining whether full reprocessing is to be performed and responsive to determining that the full reprocessing is not to be performed, recalculating, based on accessing the logged information, those of the potentially affected paths for which recalculation was postponed.

A computing device is disclosed that includes a set of one or more processors and a non-transitory machine-readable storage medium containing instructions that, when executed by the set of one or more processors, causes the computing device to carry out operations for efficiently updating information regarding a network. The operations involve a preprocessing stage, a first processing stage, and a second processing stage. The preprocessing stage involves generating a graph representing the resources of the network, wherein each node in the graph represents a network node and each link in the graph represents a network link, grouping nodes in the graph into a plurality of clusters, wherein each of the plurality of clusters includes a gateway node representing the cluster, and calculating intra-cluster paths and inter-cluster paths, wherein the intra-cluster paths include paths between nodes belonging to a given cluster and the inter-cluster paths include paths between gateway nodes belonging to different clusters. The first stage involves detecting a change to the state of the network, responsive to detecting that the change to the state of the network, updating the graph to reflect the change to the state of the network, determining paths that are potentially affected by the change to the state of the network, determining whether to postpone recalculation of any of the potentially affected paths until a second processing stage, logging information regarding those of the potentially affected paths for which recalculation is to be postponed, and recalculating any of the potentially affected paths for which recalculation is not to be postponed. The second stage involves determining whether full reprocessing is to be performed and responsive to determining that the full reprocessing is not to be performed, recalculating, based on accessing the logged information, those of the potentially affected paths for which recalculation was postponed.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
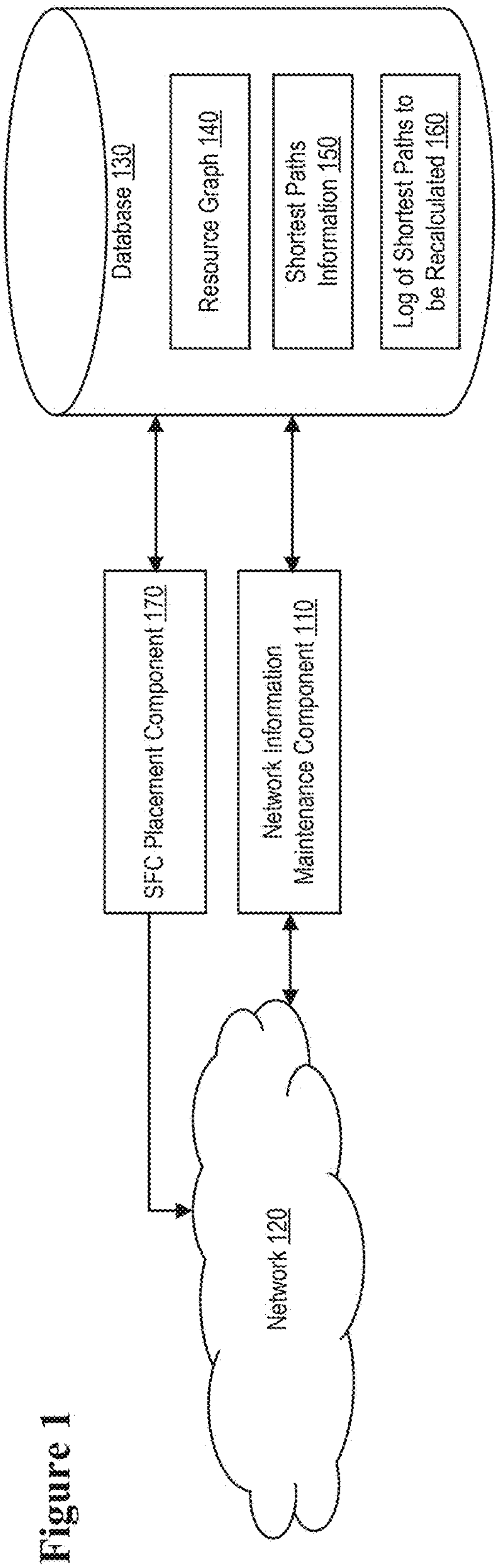
FIG. 1 is a diagram showing an environment in which network information can be efficiently updated, according to some embodiments.

The following description describes methods and apparatus for efficiently updating information regarding a network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The present disclosure introduces a methodology that uses a preprocessing stage to generate information regarding a network (also referred to herein as network information) and uses a multilevel heuristic to efficiently update the network information as the state of the network changes. The preprocessing stage may generate a graph representing the resources of network, where each node in the graph represents a network node and each link in the graph represents a network link. The preprocessing stage may group the nodes in the graph into multiple clusters (e.g., using a suitable clustering algorithm). The preprocessing stage may calculate the shortest paths between nodes within each cluster (intra-cluster paths) and the shortest paths between nodes representing different clusters (inter-cluster paths). Pre-calculating the shortest paths during the pre-processing stage may help speed up service function chain (SFC) placement since it is often desirable to place the VNFs of a SFC over a shortest path. Grouping nodes into clusters may help speed up the SFC placement process, particularly when dealing with a large-scale network and/or when there are memory limitations such that the entire graph cannot be loaded into memory.

Over time, the shortest paths calculated during the preprocessing stage may become outdated/invalid as the state of the network changes. The state of the network may change due to various reasons. For example, the amount of resources available at certain network nodes and/or network links may change due to a SFC being placed in the network and/or a SFC being removed from the network. As another example, network nodes and network links may fail, making them unavailable for SFC placements. As yet another example, new network nodes and network links may be added to the network, which can provide additional resources for SFC placements.

The multilevel heuristic may update the network information, including the shortest path information, using multiple levels of processing. In an embodiment, the multilevel heuristic considers three types of changes that can occur in the network. The first type of change is related to changes to the amount of resources available at network nodes and/or network links after a SFC placement takes place. The resources of a network node may include CPU resources, memory resources, and/or storage resources as non-limiting examples. The resources of a network link may include bandwidth resources as a non-limiting example. The second type of change is related to the disabling of network nodes and/or network links. Network nodes and/or network links may be disabled, for example, when their resources are fully consumed (e.g., due to SFC placements) or when they fail. The third type of change is related to the addition of new network nodes and/or network links in the network, which can provide additional resources for SFC placements.

The multilevel heuristic may use four levels of processing referred to herein as level 0 processing, level 1 processing, level 2 processing, and level 3 processing, respectively. While four levels of processing are described herein, it will be appreciated that the multilevel heuristic can use a different number of levels, with each level dealing with a different type of change to the network state.

Level 0 processing may be performed after each SFC placement. Level 0 processing may update information regarding the resources available at network nodes and networks links. Only information regarding the resources along the path where the SFC was placed may need to be updated. Level 0 processing is expected to execute relatively frequently (compared to other levels of processing).

Level 1 processing and level 2 processing deal with infrastructure level changes. Level 1 processing may deal with the disabling of network nodes and/or network links (e.g., due to resource consumption, failures, and/or planned network upgrades/outages). Level 2 processing may deal with the addition of new network nodes and/or network links. As will be described further herein, level 1 processing and level 2 processing may postpone performing certain updates (e.g., recalculation of shortest paths) if they are deemed to be too time consuming or not urgent. It should be noted, however, that such updates are not ignored indefinitely but information regarding the updates that were postponed is logged so that they can be performed at a later time.

Level 3 processing may deal with updates that were postponed by the previous levels. Level 3 processing may access information regarding the updates that were postponed (that was logged by the previous levels) and perform those updates. In some cases, level 3 processing may perform a full reprocessing that involves regrouping the nodes into clusters and recalculating shortest paths. Level 3 processing is the most complete/comprehensive level of processing when compared to the other levels. It is also the most computationally intensive of the four levels. Thus, level 3 processing typically takes longer to complete compared to the other levels. However, level 3 processing is not designed/expected to be performed frequently.

The multilevel heuristic may update network information more efficiently/quickly compared to conventional methods while maintaining acceptable accuracy (e.g., for purposes of determining SFC placements). Conventional methods often perform full reprocessing whenever the state of the network changes, which may take a considerable amount of time depending on the size of the resource graph and the amount of resources (e.g., CPU and memory) that are available for performing the reprocessing. Full reprocessing after every change to the network state may result in long response times, which is unacceptable for an online solution. In contrast, the multilevel heuristic may immediately perform updates that are considered essential, while postponing other updates until the last level (e.g., level 3 processing mentioned above) to speed up processing. The complete updating of network information may take place infrequently and be performed offline.

FIG. 1 is a diagram showing an environment in which network information can be efficiently updated, according to some embodiments. As shown in the diagram, the environment includes a network information maintenance component 110 that is communicatively coupled to a network 120 and a database 130. The network 120 may include network nodes and network links connecting the network nodes to allow communication between the network nodes. The network nodes may include servers, routers, and/or switches. A network node may have resources such as computational resources (e.g., CPU), memory resources (e.g., random access memory (RAM)), and/or storage resources (e.g., non-volatile storage). The network nodes may be used to host VNFs of SFCs. A network link may connect two network nodes so that the network nodes can communicate with each other. The network link may be a wired link or a wireless link. A network link may have resources such as bandwidth resources. In an embodiment, the network 120 is a datacenter network.

As will be described in additional detail herein, the network information maintenance component 110 may generate information regarding the network 120 and store this information in the database 130. The network information may include a resource graph 140 and information regarding shortest paths 150 (shortest path information may be useful for determining SFC placements). The network information maintenance component 110 may also update the network information stored in the database 130 when the state of the network 120 changes. In an embodiment, the database 130 is a relational database but other types of databases can be used.

In an embodiment, the network information maintenance component 110 generates a graph representing the network 120 and stores it in the database 130. The graph may include nodes and links, where each node of the graph represents a network node in the network 120 and each link of the graph represents a network link in the network 120. The graph representing the network 120 may be referred to herein as a resource graph 140. The network information maintenance component 110 may store the resource graph 140 in the database 130. In an embodiment, the resource graph 140 includes information regarding the resources available at network nodes and network links (e.g., as attributes of the nodes and links of the graph). In an embodiment, such information is stored separately from the resource graph 140.

In an embodiment, the network information maintenance component 110 groups nodes in the resource graph 140 into multiple clusters. The network information maintenance component 110 may use any suitable clustering algorithm to group the nodes into clusters. The network information maintenance component 110 may assign one or more of the nodes in each cluster to be representative nodes for the cluster. The representative nodes may also be referred to herein as gateway nodes. The network information maintenance component 110 may calculate the shortest paths between the nodes belonging to a given cluster (intra-cluster paths) and calculate the shortest paths between the gateway nodes belonging to different clusters (inter-cluster paths). The network information maintenance component 110 may store information regarding the shortest paths 150 (intra-cluster paths and inter-cluster paths) in the database 130. The information regarding shortest paths 150 may be useful for determining SFC placements, as it is often desirable to place a SFC on a shortest path. The clustering and shortest path calculations may be performed during a preprocessing stage.

As shown in the diagram, the environment also includes a SFC placement component 170. The SFC placement component 170 may access information regarding the network 120 such as the resource graph 140 and/or the information regarding shortest paths 150 from the database 130 and use this network information to determine where in the network 120 SFCs can be placed (e.g., which network nodes and network links to use). The SFC placement component 170 may place SFCs in the network 120 according to the SFC placement decisions it has made. The SFC placement component 170 may also remove SFCs from the network 120 (e.g., when they are no longer needed) and move SFCs (e.g., place the SFC on a different path). The SFC placement component 170 may rely on the network information stored in the database 130 to place SFCs in an optimal manner and thus it is important that the network information maintenance component 110 keeps this network information up to date (so that it reflects the current state of the network 120 as much as possible) and to do so quickly.

The network information maintenance component 110 may use a multilevel heuristic to efficiently/quickly update the network information stored in the database 130 as the state of the network 120 changes. In an embodiment, the multilevel heuristic considers three types of changes to the network state.

The first type of change may relate to changes to the amount of resources available at network nodes and/or network links in the network 120 after a SFC placement takes place. When a SFC is placed in the network 120, resources of network nodes and/or network links are consumed, and thus there is a need to update the network information stored in the database 130 to reflect this. The resources of a network node may include CPU resources, memory resources, and/or storage resources. The resources of a network link may include bandwidth resources.

The second type of change may be related to the disabling of network nodes and/or network links in the network 120. Network nodes and/or network links may be disabled when their resources are fully/mostly consumed due to SFC placements or when they fail.

The third type of change may be related to the addition of new network nodes and/or new network links in the network 120. The addition of new network nodes and/or new network links should be taken into consideration when placing SFCs.

In an embodiment, the multilevel heuristic includes four levels of processing, which are labeled as level 0 processing, level 1 processing, level 2 processing, and level 3 processing, respectively. While for purposes of illustration, the multilevel heuristic is described herein as including four levels of processing, it will be appreciated that the multilevel heuristic can use a different number of levels, with each level dealing with a different type of change to the network state.

Each of the four levels of processing are described in additional detail below.

Level 0 processing may be the most basic and frequently performed processing level. In an embodiment, the network information maintenance component 110 performs level 0 processing after each SFC placement. Level 0 processing may involve updating information regarding the amount of resources available at the network nodes and network links on which the SFC was placed. For example, the network information maintenance component 110 may update information regarding the amount of CPU, memory, and/or storage resources available at each network node on which a VNF of the SFC was placed. Also, the network information maintenance component 110 may update information regarding the amount of bandwidth resources available at each network link connecting the VNFs of the SFC. The updated information may be stored in the database 130 (e.g., as part of the resource graph 140 or separately). If, as a result of the SFC placement, the resources of a network node or network link are fully consumed or the amount of available resources falls below a threshold amount, the network information maintenance component 110 may initiate level 1 processing.

Level 1 processing may deal with the disabling of network nodes and/or network links of the network 120. A network node or network link may be disabled due its resources being fully (or mostly) consumed (resource exhaustion) or due to a failure. The resources of a network node and/or network link may be fully/mostly consumed due to a SFC placement. In an embodiment, the network information maintenance component 110 determines the amount of resources available at network nodes and network links after a SFC placement and determines whether the amount of resources available falls below a threshold amount. Network nodes and network links that do not have sufficient resources should be disabled and not be considered for future SFC placements. Thus, if the network information maintenance component 110 determines that the amount of resources available at a network node or network link falls below a threshold amount, the network information maintenance component 110 may set the status of such network nodes and network links to "unavailable" in the database 130 (to indicate that they are disabled) so that they are not considered by the SFC placement component 170 for future SFC placements until their resources are available again. In an embodiment, the network information maintenance component 110 does not remove the nodes or links representing the disabled network nodes and network links from the resource graph 140, as their resources may be restored and become available again for new SFC placements. For example, resources may become available again if a SFC is removed from the network 120 or the network operator restores a failed network node or network link.

In an embodiment, when network nodes are disabled, there is no need to recalculate shortest paths because when the status of a network node is set to "unavailable" it will not be considered for SFC placement (e.g., because the SFC placement algorithm may be configured to avoid selecting unavailable network nodes for SFC placements). However, when network links are disabled, this may affect some of the previously calculated shortest paths (such that the path is no longer valid). Thus, it might be necessary to recalculate some of the shortest paths and update the database 130 accordingly.

However, for sake of efficiency, it is desirable only to recalculate the shortest paths that are affected by the disabled network links. As will be described in additional detail below, embodiments may use a few rules to determine which shortest paths should be recalculated.

As mentioned above, the network information maintenance component 110 may group the nodes in the resource graph 140 into clusters and calculate the intra-cluster shortest paths and the inter-cluster shortest paths (e.g., as part of the preprocessing stage). In an embodiment, the network information maintenance component 110 groups all links in the graph that belong to the same cluster and creates a dictionary where the key is the cluster ID and the value is the respective links belonging to the cluster. For the links that belong to the gateway node subgraph (a subgraph connecting the gateway nodes), a special cluster ID different from the other clusters may be defined. The network information maintenance component 110 may iterate over all the links of each cluster to determine the shortest paths that were affected by the disabled network links. For example, the network information maintenance component 110 may examine all of the current shortest paths (both the inter-cluster shortest paths and the intra-cluster shortest paths) and determine which of those shortest paths include a disabled link. The network information maintenance component 110 may add the shortest paths that include a disabled link to the list of affected shortest paths. The goal is to only recalculate the shortest paths that were affected (and avoid recalculating the shortest paths that were not affected). In an embodiment, the network information maintenance component 110 determines whether the number of affected shortest paths is above a threshold number (the threshold number may be configurable). If the number of affected shortest paths is above the threshold number, the network information maintenance component 110 may postpone recalculating the affected shortest paths until level 3 processing, as the recalculation could take a long time. For this purpose, the network information maintenance component 110 may log information regarding the affected shortest paths in the database 130 (shown in the diagram as log of shortest paths to be recalculated 160). However, if the number of affected shortest paths within a cluster is not above the threshold number, the network information maintenance component 110 may maintain the intra-cluster's subgraph. As mentioned above, if the cluster ID is the special one (for the gateway nodes), the network information maintenance component 110 may select the gateways subgraph. The network information maintenance component 110 may then recalculate the shortest paths that are affected by the disabled network links and update the database 130 accordingly (e.g., update the shortest paths information 150).

The level 2 processing may deal with network nodes and/or network links being added to the network 120. When a new network node is added, the network information maintenance component 110 may add a new node representing the new network node to the resource graph 140 and assign the new node to an existing cluster. Also, the network information maintenance component 110 may store information regarding the network links that connect the new network node to other network nodes in the database 130 (e.g., update the resource graph 140). In order to avoid running a clustering algorithm on all of the nodes in the resource graph again, the network information maintenance component 110 may use a heuristic to assign the new node to a cluster. For example, the network information maintenance component 110 may determine the cluster membership of the neighboring nodes of the new node and add the new node to the most frequently appearing cluster among the neighboring nodes. After assigning the new node to a cluster, the network information maintenance component 110 may calculate the shortest paths between the new node and other nodes in the cluster and store information regarding these shortest paths in the database 130 (e.g., as part of the shortest paths information 150).

When a new network link is added, the network information maintenance component may add a new link representing the new network link to the resource graph 140 and store information regarding the new network link in the database 130. In an embodiment, the network information maintenance component 110 groups the links that belong to the same cluster.

The network information maintenance component 110 may iterate over the clusters. The gateway nodes may be considered as a separate cluster. The network information maintenance component 110 may determine the link capacity of each cluster. The link capacity of a cluster may be expressed as the percentage of links in the cluster that are operational. A link may be considered to be operational when the network link that it represents is not in a faulty state and has a minimum percentage of resources available (e.g., bandwidth resources). The minimum percentage may be configurable.

When new network links are added, the network information maintenance component 110 may check for two conditions to determine whether the shortest paths should be recalculated immediately or be postponed. In an embodiment, the network information maintenance component 110 recalculates the shortest paths within a cluster if one or both of the two conditions are met. The first condition for recalculating shortest paths within a cluster may relate to the link capacity. If the link capacity of a cluster is below a threshold link capacity (the threshold link capacity may be configurable), the network information maintenance component 110 may recalculate all of the shortest paths within the cluster. The network information maintenance component 110 may recalculate all shortest paths within the cluster when the link capacity is low (below the threshold link capacity), as the previously calculated shortest paths are more likely to be affected when the link capacity is low, and adding new links may result in new and better paths between nodes. Such new links should thus be taken into consideration. However, if the link capacity of a cluster is high, most of the previously calculated shortest paths (e.g., calculated during the preprocessing stage) are likely to be valid and available for new SFC placements. Thus, in this case, the network information maintenance component 110 may postpone recalculating the shortest paths within the cluster until level 3 processing (e.g., assuming the second condition is not met).

The second condition for recalculating the shortest paths within a cluster may relate to the number of nodes in the subgraph. For example, if the network information maintenance component 110 determines that the size of a cluster (e.g., the number of nodes in the cluster) is above a threshold cluster size, the network information maintenance component 110 may postpone recalculating the shortest paths within the cluster until level 3 processing to speed up the execution time during level 2 processing. The threshold cluster size may be configurable. Otherwise, if the network information maintenance component 110 determines that the size of the cluster is not above the threshold cluster size, the network information maintenance component 110 may immediately recalculate the shortest paths within the cluster during level 2 processing and update the database 130 accordingly.

The network information maintenance component 110 may log information regarding the shortest paths for which recalculation is being postponed in the database 130 (as part of log of shortest paths to be recalculated 160).

The network information maintenance component 110 may perform level 3 processing periodically. Level 3 processing may involve performing any updates that were not performed (postponed) by the previous levels according to certain parameters to avoid complex and time-consuming updates that could impact the performance of the heuristics or because the update was considered to have a negligible impact. Level 3 processing may be performed offline or online (e.g., while the SFC placement component 170 is running and accessing the database 130).

Level 3 processing exists because, in addition to having to process the updates that were postponed by the other levels, after a considerable amounts of changes to the network state, the network information stored in the database 130 might not accurately reflect the current state of the network 120 (e.g., the resource graph 140 (along with its clustering and the gateway selection) and shortest paths information 150 might not be accurately reflected). In this situation, full reprocessing should be performed, which may involve regrouping the nodes into clusters and recalculating shortest paths. However, performing full reprocessing is a time-consuming and resource-intensive task that should be avoided as much as possible. To mitigate this problem, there needs to be a balance between how frequently level 3 processing is performed and the amount of changes that can be made to the resource graph 140 without compromising accuracy/performance. This may be something that is determined empirically.

In an embodiment, the network information maintenance component 110 compares the clusters size distribution of those stored in the database 130 with the distribution of the size of the clusters from the updated graph to determine whether there are significant differences between them. If the differences are significant (what is considered significant may be configurable), then the network information maintenance component 110 may perform full reprocessing. Otherwise, if the differences are not significant, the network information maintenance component 110 may only recalculate the shortest paths indicated in the log of shortest paths to be recalculated 160 (e.g., the shortest paths for which recalculation was postponed during level 1 processing and level 2 processing).

For example, the network information maintenance component 110 may determine the distribution of number of clusters of the base resource graph (e.g., which may be the original resource graph that was generated during the preprocessing stage along with information about clusters, gateways, and shortest paths). The network information maintenance component 110 may then perform a clustering algorithm on the current graph (e.g., which may include several changes that were made over time). The network information maintenance component 110 may then perform a significant difference test between the two cluster distributions (between the cluster distribution of the base resource graph and the cluster distribution of the current resource graph). In an embodiment, the significant difference test is a goodness-of-fit test or other statistical test such as the Kolmogorov-Smirnov test, but it should be appreciated that other algorithms/tests can be used. If the network information maintenance component 110 determines that the difference is significant (e.g., p-value>0.05), the network information maintenance component 110 may perform full reprocessing, which may result in new clusters, gateways, and shortest paths, and the network information maintenance component 110 may update the database 130 with this new information. If there is a significant change in the network state, SFCs that have already been placed in the network 120 may be impacted and not be optimally placed. Thus, in an embodiment, the SFC placement component 170 may move the SFCs to be more optimally allocated after having performed a level 0 update of information in the database 130.

If the network information maintenance component 110 determines that the difference is not significant, the network information maintenance component 110 may access the log of shortest paths to be recalculated 160 (e.g., which records the shortest paths for which recalculation was postponed during previous levels of processing) and determine whether there are any shortest paths to be recalculated. If so, the network information maintenance component 110 may recalculate the shortest paths and update the database 130 accordingly (e.g., update the shortest paths information 150). In an embodiment, the network information maintenance component 110 uses the logs to determine whether there are any changes in the gateway subgraph, and if so, perform processing for this subgraph.

The multilevel heuristic provides parameter-based flexibility. For example, as mentioned above, there can be flags and parameters that can be used to force the updating process at a given processing level. The multilevel heuristic described offers a mechanism to signal the importance of new resources, forcing complete reprocessing to take place. For example, the inclusion of an entire new regional data center, some major servers, or new high-speed links may justify forcing the reprocessing of the entire resource graph and generating new representative data structures. An administrator may therefore use this feature to perform complete reprocessing. Embodiments continuously maintain state along with a historical trace of resource changes. Sometimes some database updates are only partially executed in order to keep processing times low and thus provide a short response time. However, it should be noted that these updates are not ignored indefinitely. Instead, they may be selectively postponed to when higher processing levels of the heuristic are performed. Embodiments keep track of which updates have not yet been performed in order to execute these at a later time during a higher level of processing. In an embodiment, a threshold representing the number of postponed updates or a threshold that measures their impact level or urgency may be used as a parameter to decide whether to take these changes into consideration and force their execution/update. While the preprocessing and multilevel heuristic are described in the context of helping expedite/optimize SFC placement decisions, it should be appreciated that they can be adapted to efficiently update network information for other use cases or applications.

Figure 2:
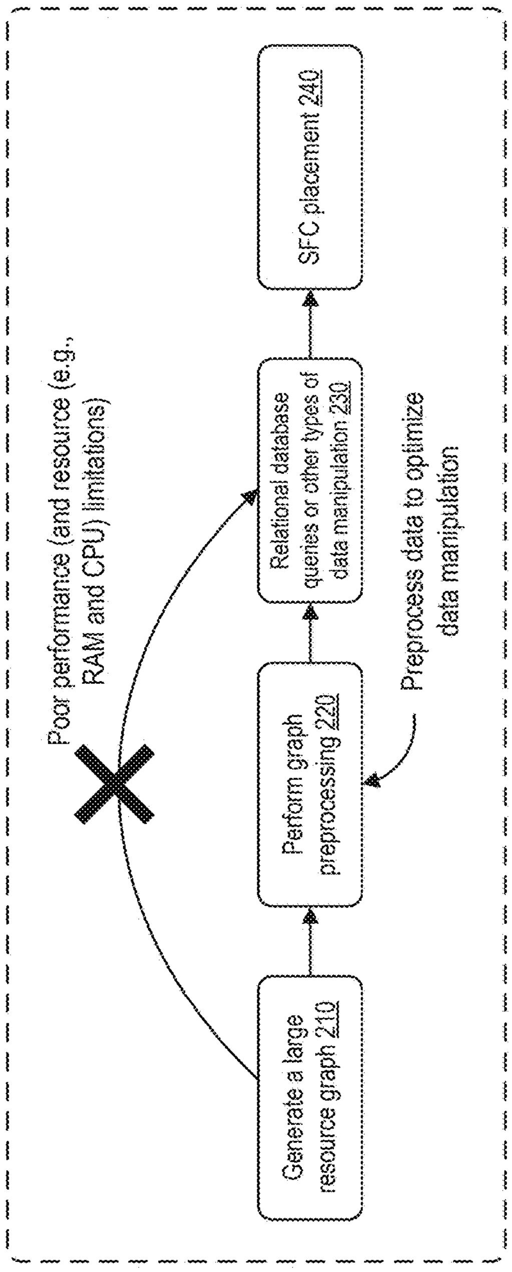
FIG. 2 is a diagram showing steps for performing SFC placement, according to some embodiments.

FIG. 2 is a diagram showing steps for performing SFC placement, according to some embodiments. As shown in the diagram, the first step 210 is to build a large resource graph representing the resources of the network. The second step 220 is to perform graph preprocessing. The third step 230 is to submit relational database queries or perform other forms of data manipulation. The fourth step 240 is to perform SFC placement. Conventional SFC placement methodologies submit relational database queries or perform other forms of data manipulation without performing graph preprocessing, which results in poor performance, particularly when the computing device determining the SFC placement is resources constrained (e.g., constrained in terms of CPU, RAM, etc.). Embodiments preprocess the data (e.g., by clustering nodes in the resource graph and/or precalculating shortest paths, as described herein above) to optimize data retrieval and manipulation.

Figure 3:
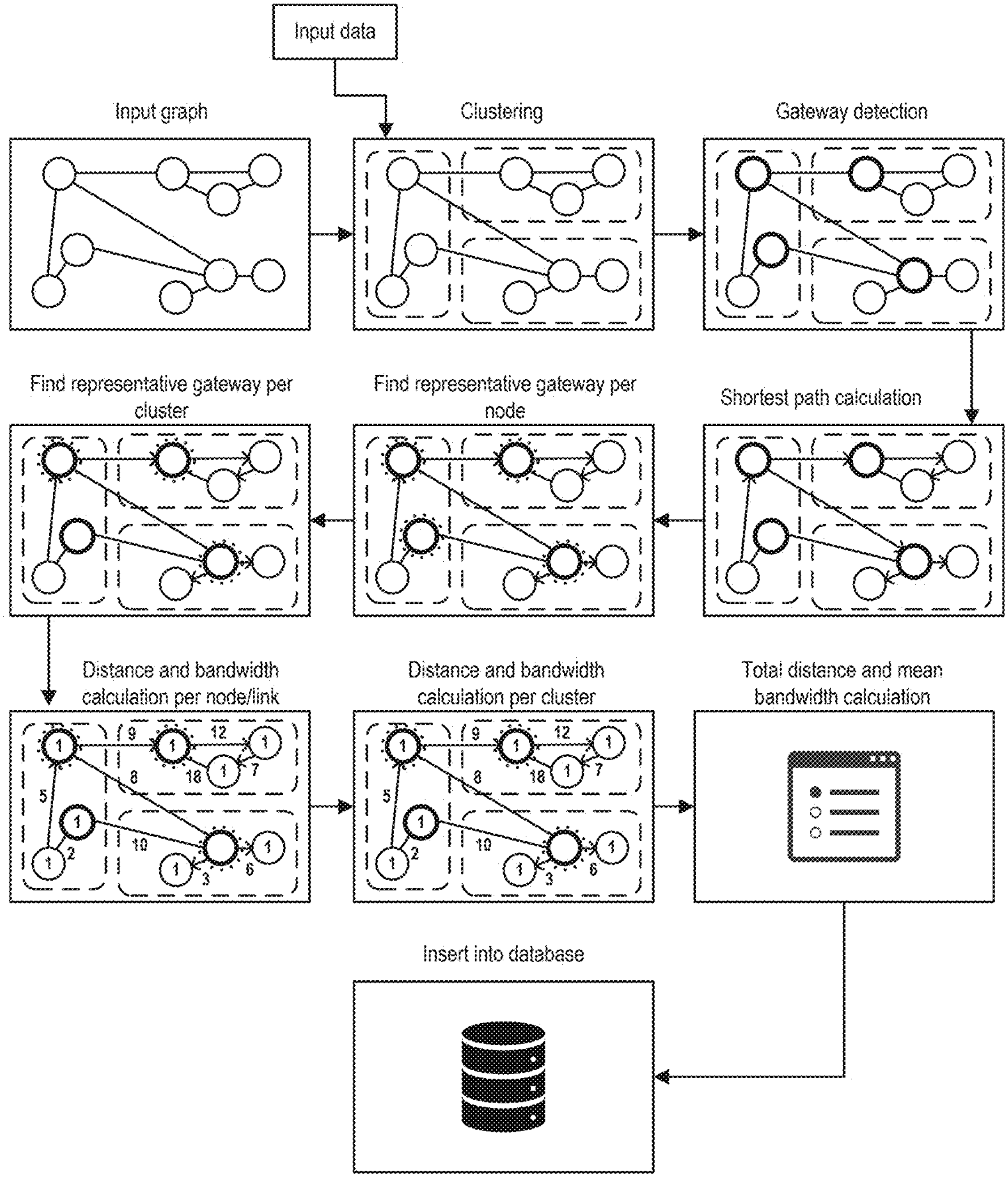
FIG. 3 is a diagram showing preprocessing stage operations, according to some embodiments.

FIG. 3 is a diagram showing preprocessing stage operations, according to some embodiments. In order to avoid the need to store the shortest paths between all pairs of nodes of the graph in the database, the preprocessing stage may use a clustering approach. As shown in the diagram, the preprocessing stage may group the nodes of an input graph into clusters (the clusters are depicted in the diagram using dashed lines). The clusters may be created manually or automatically using known clustering algorithms. If the clusters are created manually, information about the groupings may be passed as part of the input data. Otherwise, if the clusters are created automatically, the input data may define some characteristics of the clustering depending on the clustering algorithm used (e.g., the number of clusters that are to be created). Each node in the input graph may be assigned an attribute that indicates the cluster membership of the node (which cluster the node belongs to). As a result of the clustering, some nodes may have neighboring nodes that belong to other clusters. Such nodes may be designated as representative nodes for their respective clusters and may be referred to herein as gateway nodes (or simply as gateways). The preprocessing stage may detect the gateways of each cluster (the gateway nodes are depicted in the diagram using circles with bolded lines). Gateways are important because they are the means for gaining access to other clusters and thus to the nodes belonging to the other clusters. The path from a node in one cluster to another node in another cluster passes through gateways. The preprocessing stage may calculate the shortest paths between the nodes. In order to avoid calculating the shortest paths between all pairs of nodes, which does not scale well, the preprocessing stage may calculate the shortest paths between all pairs of nodes within each cluster (intra-cluster paths), as well as the shortest paths between clusters (inter-cluster paths). Since each node has an associated cluster attribute, the preprocessing stage may create subgraphs for each cluster and calculate the shortest paths between nodes of the subgraph for a given cluster. To calculate inter-cluster shortest paths, the preprocessing stage may create a subgraph composed of gateways and calculate the shortest paths between all gateway pairs. Based on the gateways and the shortest paths information, the preprocessing stage may associate a list of gateways with each node of the input graph. These gateways may be referred to as representative gateways. Each node may have a gateway list, where each gateway in the list is the best node to reach a particular cluster. In an embodiment, each node only has one gateway associated with a given cluster (e.g., for each cluster, each node has one gateway that provides the shortest path to reach the gateway of the cluster). Based on the clusters, gateways, and the shortest paths between nodes, the preprocessing stage may define the representative gateways for each node in a particular cluster. The preprocessing stage may define the representative gateway per cluster. The preprocessing stage may calculate distance and bandwidth per node/link. The preprocessing stage may calculate distance and bandwidth per cluster. The preprocessing stage may calculate the total distance and mean bandwidth. The preprocessing stage may store the information in the database.

Figure 4:
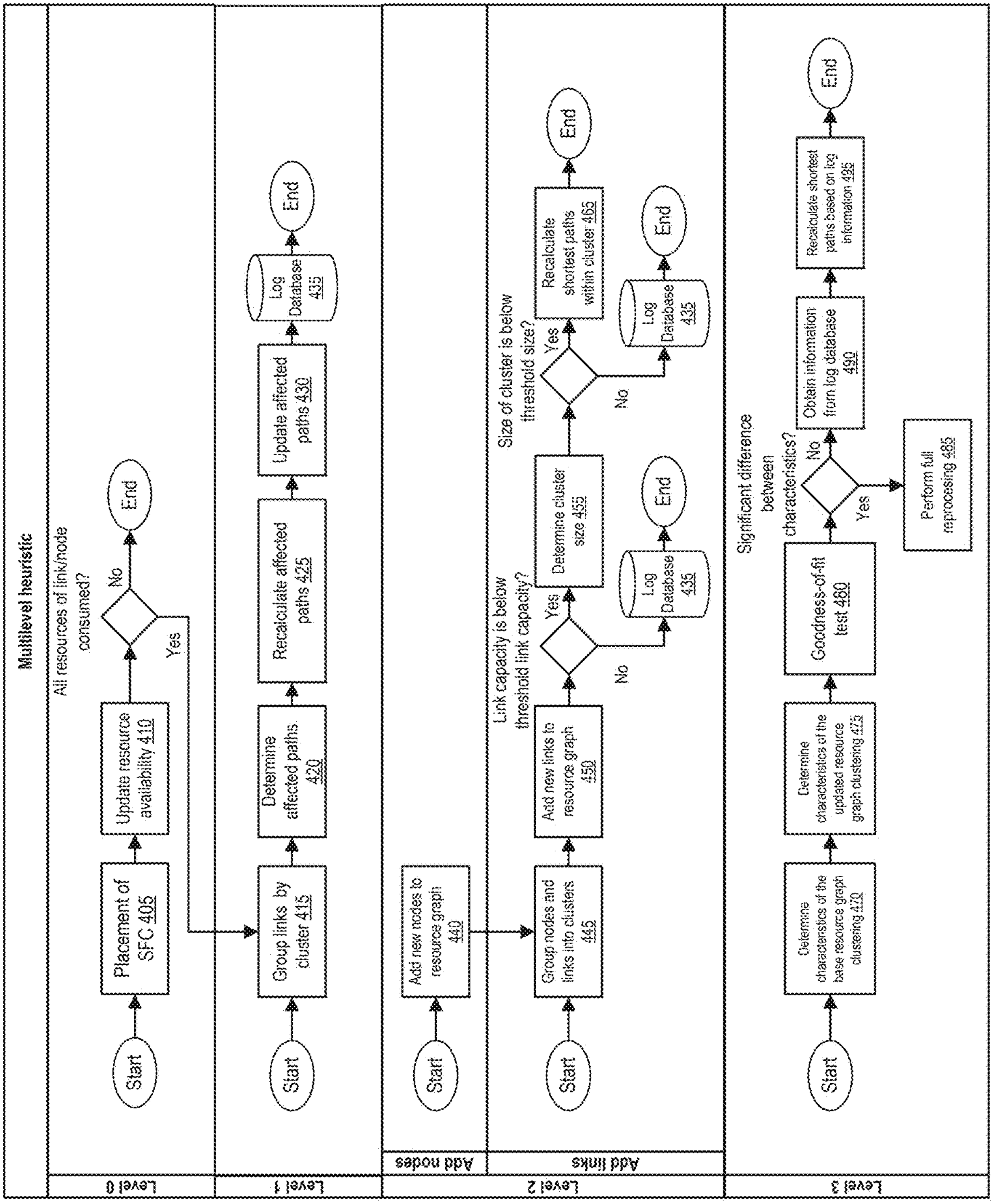
FIG. 4 is a diagram showing a multilevel heuristic, according to some embodiments.

FIG. 4 is a diagram showing a multilevel heuristic, according to some embodiments. As shown in the diagram, at level 0 processing, when a SFC is placed (operation 405), the heuristic updates information regarding the amount of resources available at the network nodes and network links along the path on which the SFC was placed (operation 410). The heuristic determines whether all resources of a network node or network link are consumed (or whether the amount of resources available at the network node or network link is below a threshold amount). If all resources have been consumed, then this triggers level 1 processing. Otherwise, the level 0 processing ends.

Also, as shown in the diagram, at level 1 processing, the heuristic groups links into clusters (operation 415), determines the shortest paths (if any) affected by the disabled network link (operation 420), recalculates the affected shortest paths (operation 425), and updates information regarding the affected shortest paths (operation 430). The heuristic may store information regarding any updates that were not performed at level 1 processing (e.g., affected shortest paths that were not recalculated due to the number of affected paths in cluster being above a threshold number) in a log database 435.

Also, as shown in the diagram, at level 2 processing, when new network nodes are added to the network, the heuristic adds new nodes representing the new network node to the resource graph (operation 440). The heuristic may then proceed to operation 445.

When new network links are added to the network, the heuristic groups nodes and links into clusters (operation 445) and adds new links representing the new network links to the resource graph (operation 450). The heuristic then determines whether the link capacity of a cluster is below a threshold link capacity. If not, then the heuristic postpones recalculating shortest paths within the cluster and stores information regarding the postponed updates in the log database 435. Otherwise, if the link capacity of a cluster is below a threshold link capacity, then the heuristic determines the cluster size (e.g., the number of nodes in the cluster) (operation 455). The heuristic then determines whether the size of the cluster is below a threshold size. If not, the heuristic postpones recalculating shortest paths within the cluster and stores information regarding the postponed updates in the log database 435. Otherwise, if the size of the cluster is below the threshold size, then the heuristic recalculates the shortest paths within the cluster (operation 465) and stores this information.

Also, as shown in the diagram, at level 3 processing, the heuristic determines the characteristics of the base resource graph clustering (e.g., cluster distribution) (operation 470), determines the characteristics of the updated resource graph clustering (e.g., cluster distribution) (operation 475), and performs a goodness-of-fit test to compare the similarity between the two clusterings (operation 480). The heuristic determines whether there are significant differences between the characteristics (based on the result of the goodness-of-fit test). What is considered a significant difference is configurable. If there are significant differences, then the heuristic may perform full reprocessing (operation 485). Otherwise, the heuristic may obtain information from the log database 435 regarding the postponed updates (operation 490) and perform those updates, which may involve recalculating shortest paths for which recalculation was postponed during the previous levels (operation 495).

Figure 5:
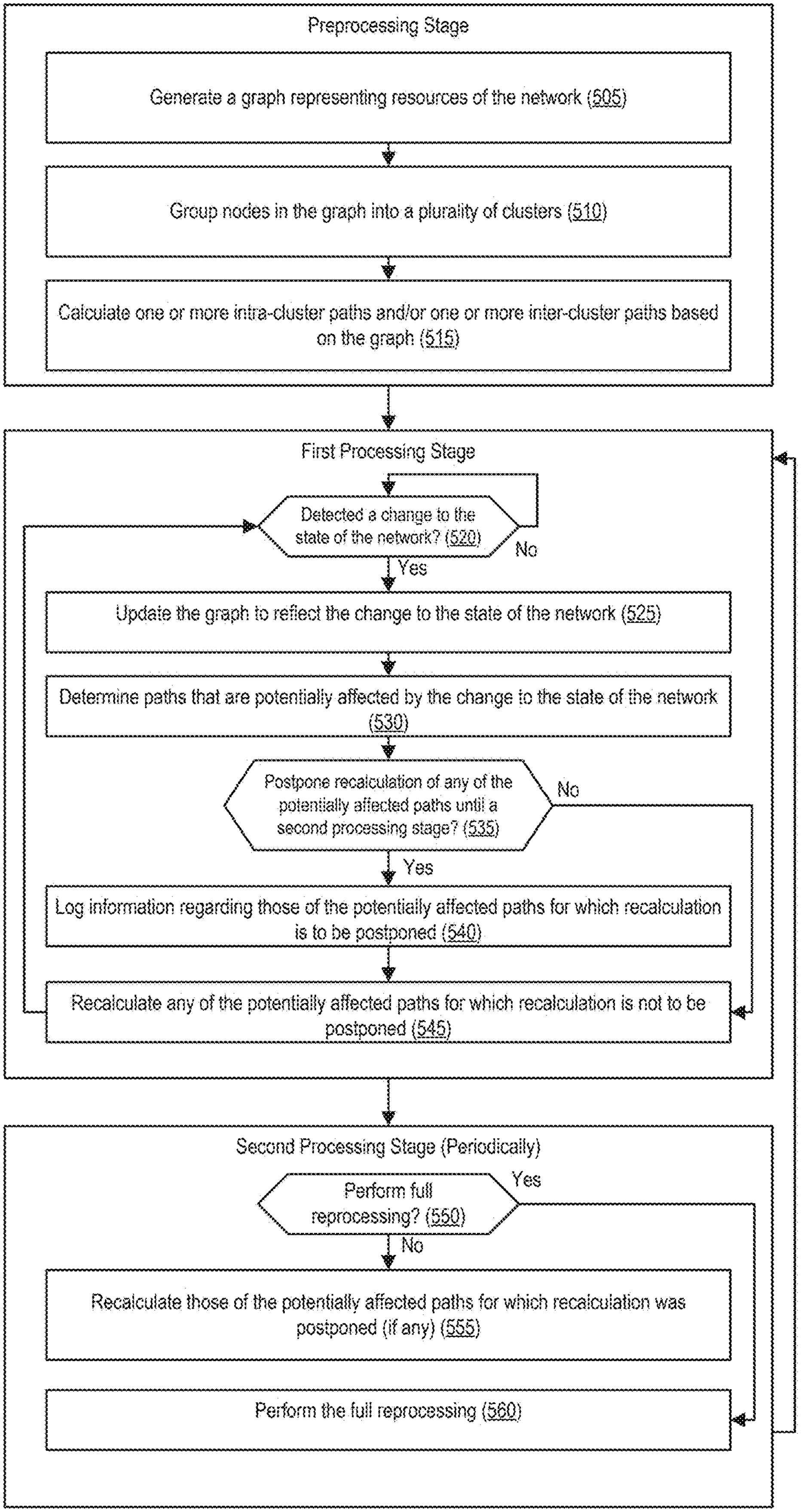
FIG. 5 is a flow diagram of a method for efficiently updating information regarding a network, according to some embodiments.

FIG. 5 is a flow diagram of a method for efficiently updating information regarding a network, according to some embodiments. The method may be performed by one or more computing devices. The method may be implemented using hardware, software, firmware, or any combination thereof.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. Additionally, although shown in a particular order, in some embodiments the operations shown in the diagram (and the operations shown in the other diagrams) may be performed in a different order. Also, in some embodiments, certain operations may be omitted. For example, in some scenarios, the operations of the second processing stage (e.g., operations 550-560) may be performed without performing the operations of the preprocessing stage (e.g., operations 505-515) and/or without performing the operations of the first processing stage (e.g., operations 520-545).

During a preprocessing stage, the one or more computing devices may perform operations 505-515.

At operation 505, the one or more computing devices generate a graph representing resources of the network. In some embodiments, each node in the graph represents a network node and each link in the graph represents a network link between two network nodes.

At operation 510, the one or more computing devices group nodes in the graph into a plurality of clusters. Each cluster included in the plurality of clusters includes a gateway node that represents the cluster. A gateway node of a cluster may provide a means for other nodes in the cluster to reach nodes that belong to other clusters (e.g., the gateway node has one or more neighboring nodes that belong to other clusters).

At operation 515, the one or more computing devices calculate one or more intra-cluster paths and/or one or more inter-cluster paths based on the graph. The intra-cluster paths include paths between nodes belonging to a given cluster. The inter-cluster paths include paths between gateway nodes belonging to different clusters. In an embodiment, the paths are shortest paths.

During a first processing stage, the one or more computing devices may perform operations 520-545. In some embodiments, the first processing stage corresponds to level 1 processing and level 2 processing of the multilevel heuristic described herein above.

At operation 520, the one or more computing devices determine whether a change to the state of the network has been detected. If a change to the state of the network has not been detected, flow passes back to operation 520. Otherwise, if a change to the state of the network has been detected, flow passes to operation 525.

At operation 525, the one or more computing devices update the graph to reflect the change to the state of the network. In some embodiments, updating the graph may include setting the status of network nodes/links to "unavailable" in a database (e.g., to indicate that they are not available for SFC placements if their resources are exhausted). In some embodiments, updating the graph may include adding one or more new nodes and/or one or more new links to the graph (e.g., when new network nodes and/or network links are added to the network).

At operation 530, the one or more computing devices determine paths that are potentially affected by the change to the state of the network. For example, in some embodiments, the one or more computing devices identify one or more paths (e.g., paths that could become invalid and/or outdated due to the change to the state of the network) based on the updated graph.

At operation 535, the one or more computing devices determine whether to postpone recalculation of any of the potentially affected paths until a second processing stage. In some embodiments, determining whether to postpone recalculation of a potentially affected path includes determining whether the link capacity of a cluster is above a threshold link capacity. Recalculation may be postponed if the link capacity of the cluster is above the threshold link capacity (as this indicates that most of the previously calculated paths are likely to be valid). In some embodiments, determining whether to postpone recalculation of potentially affected paths includes determining whether a size of the cluster is above a threshold cluster size. Recalculation may be postponed if the size of the cluster is above the threshold cluster size (as the recalculation may be considered too time-consuming). In some embodiments, both conditions have to be met to postpone recalculation, while in other embodiments, recalculation is postponed if either of the conditions is met. Additionally, in various embodiments, different and/or additional conditions could be used.

If the one or more computing devices determine that recalculation of one or more potentially affected paths should be postponed until a second processing stage, flow passes to operation 540. Otherwise, if the one or more computing devices determine that recalculation of none of the potentially affected paths should be postponed, flow passes to operation 545.

At operation 540, the one or more computing devices log information regarding those of the potentially affected paths for which recalculation is to be postponed. The logged information may include, for example, information regarding the endpoints of the affected paths and the cluster to which the affected paths belong.

At operation 545, the one or more computing devices recalculate any of the potentially affected paths for which recalculation is not to be postponed.

During a second processing stage (which may occur periodically), the one or more computing devices may perform operations 550-560. In some embodiments, the second processing stage corresponds to level 3 processing of the multilevel heuristic described herein above.

At operation 550, the one or more computing devices determine whether to perform full reprocessing. In an embodiment, the determination of whether to perform full reprocessing is based on determining whether a current distribution of clusters is significantly different from a previous distribution of clusters (e.g., using a Kolmogorov-Smirnov test). In some embodiments, cluster distributions are considered significantly different if the result/output of a goodness of fit test (e.g., that can assess the similarity between distributions) applied to the cluster size distributions is above a first predefined threshold and/or below a second predefined threshold. Each of the thresholds may be separately configurable.

If the one or more computing devices determine that full reprocessing should not be performed, flow passes to operation 555. Otherwise, if the one or more computing devices determine that full reprocessing is to be performed, flow passes to operation 560.

At operation 555, the one or more computing devices recalculate those of the potentially affected paths for which recalculation was postponed, if any. In some embodiments, the one or more computing devices determine one or more potentially affected paths to recalculate based on accessing logged information that indicate the one or more paths to recalculate (e.g., information stored in log database 435). Accordingly, at operation 555, only the potentially affected paths for which recalculation was postposed are recalculated, rather than recalculating all intra-cluster paths and inter-cluster paths (i.e., full reprocessing).

At operation 560, the one or more computing devices perform the full reprocessing. In some embodiments, performing the full reprocessing includes regrouping nodes in the graph into a plurality of clusters and recalculating intra-cluster paths and inter-cluster paths.

After the second processing stage has been completed, flow may return to the first processing stage.

Figure 6:
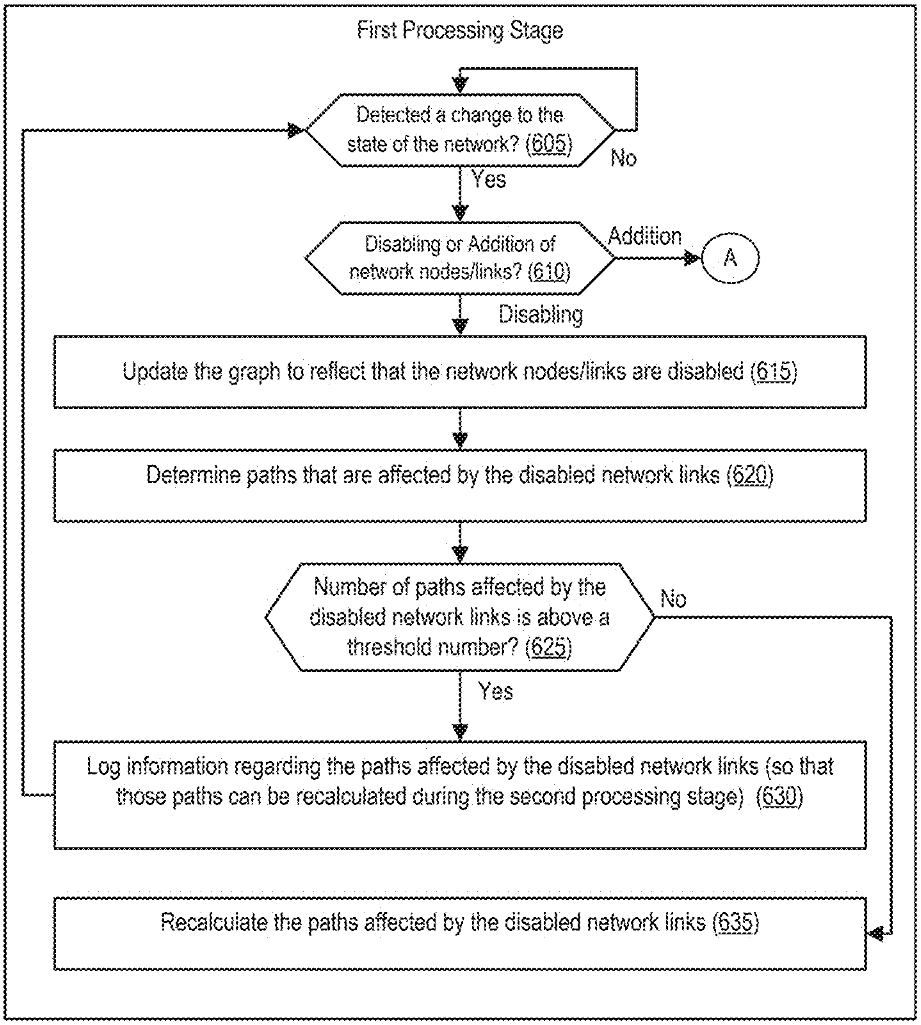
FIG. 6 is a flow diagram showing more detailed operations of first processing stage, according to some embodiments.
Figure 6:
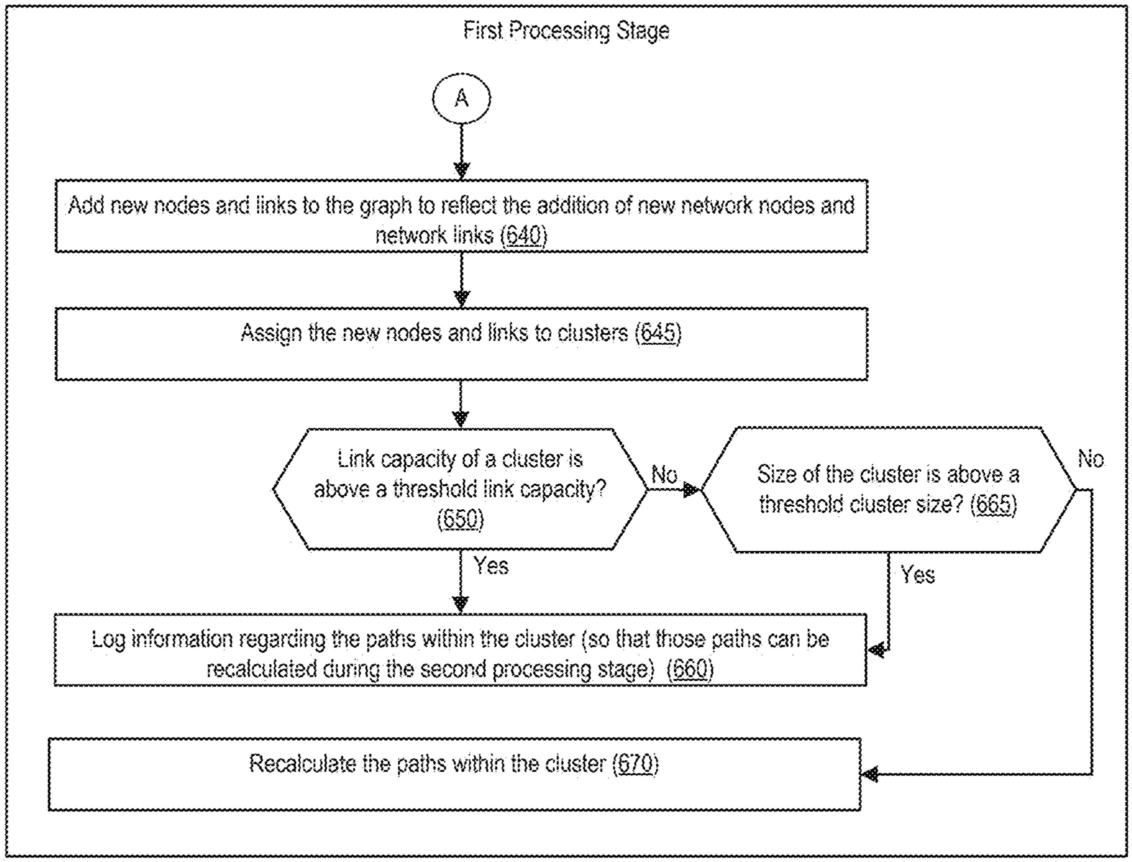

FIG. 6 is a flow diagram showing more detailed operations of first processing stage, according to some embodiments.

At operation 605, the one or more computing devices determine whether a change to the state of the network has been detected. In some embodiments, the change to the state of the network includes one or more of: the disablement of one or more network nodes, the disablement of one or more network links, the addition of one or more network nodes, or the addition of one or more links. If the one or more computing devices determine that a change to the state of the network has not been detected, flow passes back to operation 605. Otherwise, if the one or more computing devices determine that a change to the state of the network has been detected, flow passes to operation 610.

At operation 610, the one or more computing devices determine whether any network nodes/links have been disabled or any network nodes/links have been added. If the one or more computing devices determine that one or more network nodes and/or one or more network links have been disabled, then flow passes to operation 615.

At operation 615, the one or more computing devices update the graph to reflect that the one or more network nodes and/or one or more network links are disabled. Updating the graph may include setting the status of the disabled network nodes/links to "unavailable" in a database.

At operation 620, the one or more computing devices determine paths that are affected by the disabled network links. In some embodiments, determining the paths that are affected by the disabled network links includes iterating through the current paths and determining which of the current paths include a disabled link.

At operation 625, the one or more computing devices determine whether the number of paths affected by the disabled network links (e.g., within a cluster) is above a threshold number. If the number of paths affected by the disabled network links is above the threshold number, flow passes to operation 630.

At operation 630, the one or more computing devices log information regarding the paths affected by the disabled network links. Logging information regarding the paths enables those paths to be recalculated during a second processing stage. The logged information may include, for example, information regarding the endpoints of the affected paths and the cluster to which the affected paths belong. Flow may then pass back to operation 605 to detect further changes to the state of the network.

Returning to operation 625, if the number of paths affected by the disabled network links is not above the threshold number, flow passes to operation 635. At operation 635, the one or more computing devices recalculate the paths affected by the disabled network links. Flow may then pass back to operation 605.

In some embodiments, operations 625-635 discussed above may be performed per cluster. In such embodiments, the one or more computing devices could repeat the operations 625-635 for each cluster and/or perform the operations 625-635 for multiple clusters in parallel.

Returning to operation 610, if one or more network nodes and/or one or more network links have been added, then flow passes to operation 640.

At operation 640, the one or more computing devices add one or more new nodes and/or one or more new links to the graph to reflect the addition of the new network nodes and/or network links.

At operation 645, the one or more computing devices assign the one or more new nodes and/or one or more new links to clusters. In some embodiments, a new node is assigned to the most frequently appearing cluster among neighbor nodes of the new node. In some embodiments, a new link is assigned to the cluster to which the nodes connected to the new link belong.

At operation 650, the one or more computing devices determine whether the link capacity of a cluster is above a threshold link capacity. In some embodiments, the link capacity of a cluster is expressed as the percentage of links in a cluster that are operational. If the link capacity of the cluster is above the threshold link capacity, flow passes to operation 660. Otherwise, if the link capacity of the cluster is not above the threshold link capacity, flow passes to operation 665.

At operation 660, the one or more computing devices log information regarding the paths within the cluster (so that those paths can be recalculated during the second processing stage). The logged information may include, for example, information regarding the endpoints of the affected paths and the cluster identifier.

At operation 665, the one or more computing devices determine whether the size of the cluster is above a threshold cluster size. The size of the cluster may be expressed as the number of nodes in the cluster. If the size of the cluster is above the threshold cluster size, flow passes to operation 660, where the one or more computing devices log information regarding the paths within the cluster. Otherwise, if the size of the cluster is not above the threshold cluster size, flow passes to operation 670.

At operation 670, the one or more computing devices recalculate the paths within the cluster. Recalculating the paths within the cluster may include recalculating paths between all pairs of nodes in the cluster.

In some embodiments, operations 650-670 discussed above may be performed per cluster. In such embodiments, the one or more computing devices could repeat the operations 650-670 for each cluster and/or perform the operations 650-670 for multiple clusters in parallel.

One technical advantage of the embodiments, is that network information is efficiently/quickly updated as the state of the network changes. For example, it has been shown that for a resource graph having 10,000 nodes, conventional methodologies take on average around 2,000 seconds to update network information when a few network nodes/links are added. In contrast, the embodiments described herein can update the network information almost instantaneously. In particular, using the multilevel heuristic, the shortest paths do not need to be recalculated every time a network link is added when the network has high capacity. Instead, when the network has high capacity, updating the shortest paths is postponed to level 3 processing, which is performed with less frequency. Similarly, it has been shown that conventional methodologies can take more than 80 seconds to update network information when intra-cluster nodes are added, whereas embodiments using the multilevel heuristic may take less than two seconds for the same scenario. Also, it has been shown that conventional methodologies can take over 2,000 seconds to update network information when inter-cluster links are added, whereas embodiments using the multilevel heuristic may take around seven seconds for the same scenario.

Figure 7A:
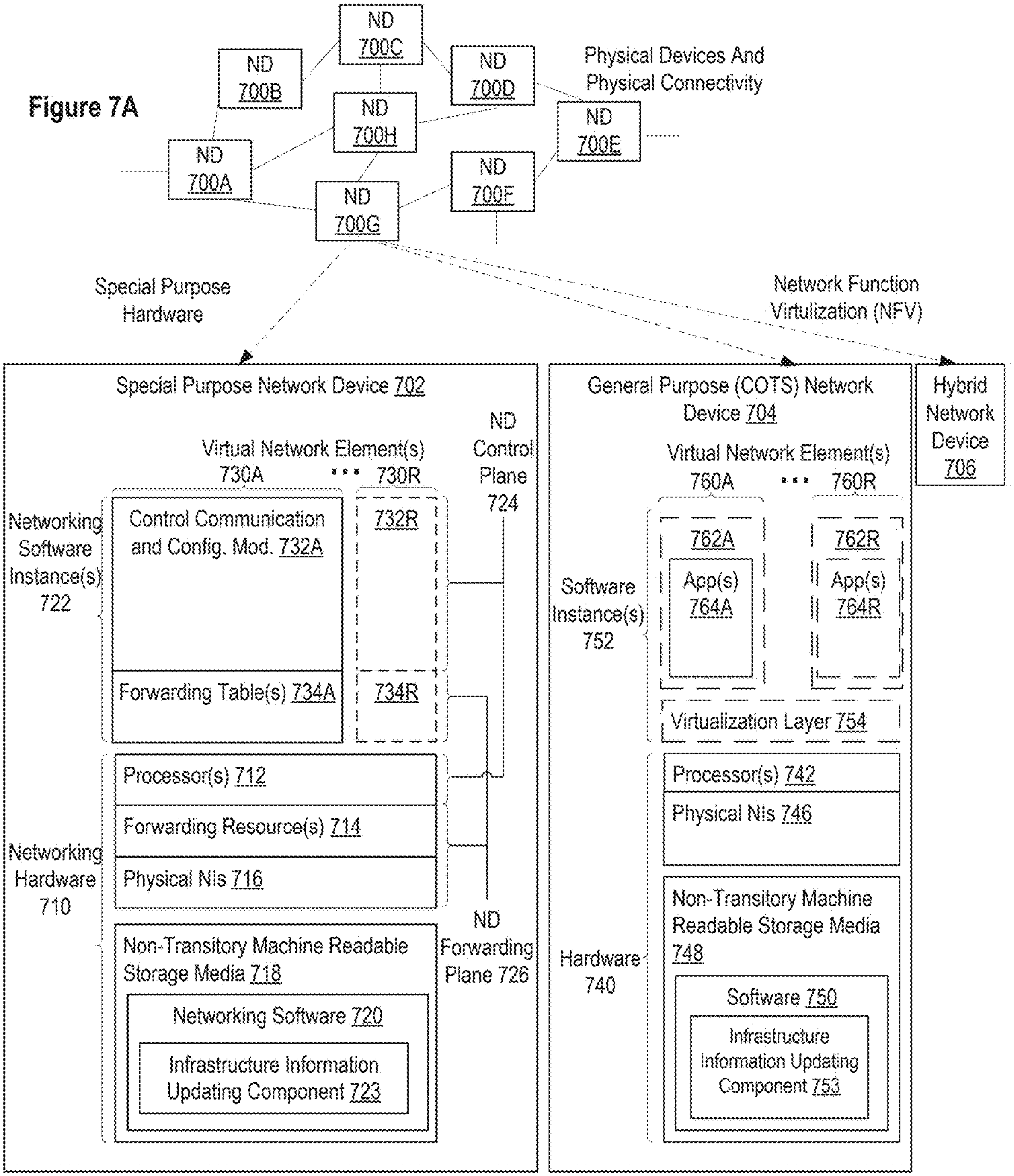
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS), and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

In an embodiment, software 720 includes code such as infrastructure information updating component 723, which when executed by networking hardware 710, causes the special-purpose network device 702 to perform operations of one or more embodiments disclosed herein (e.g., use a multilevel heuristic to efficiently update information regarding a network/infrastructure).

Figure 7B:
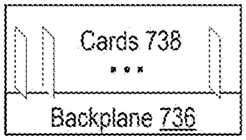
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R, where the multiple software containers (also called virtualization engines, virtual private servers, or jails) are user spaces (typically a virtual memory space) that are separate from each other and separate from the kernel space in which the operating system is run, and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

In an embodiment, software 750 includes code such as infrastructure information updating component 753, which when executed by hardware 740, causes the general purpose network device 704 to perform operations of one or more embodiments disclosed herein (e.g., use a multilevel heuristic to efficiently update information regarding a network/infrastructure).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended to be limiting. One having ordinary skill in the art would recognize that variations can be made to the flow diagrams.

In the foregoing specification, embodiments have been described with reference to specific exemplary embodiments thereof. It will be evident that various modifications may be made thereto without departing from the broader spirit and scope of the disclosure provided herein. The specification and drawings are, accordingly, to be regarded in an illustrative sense rather than a restrictive sense.

What is claimed is:

1. A method performed by one or more computing devices to efficiently update information regarding a network, the method comprising:
during a preprocessing stage:
generating a graph representing resources of the network, wherein each node in the graph represents a network node and each link in the graph represents a network link;
grouping nodes in the graph into a plurality of clusters, wherein each of the plurality of clusters includes a gateway node representing the cluster;
calculating intra-cluster paths and inter-cluster paths, wherein the intra-cluster paths include paths between nodes belonging to a given cluster and the inter-cluster paths include paths between gateway nodes belonging to different clusters;
during a first processing stage:
detecting a change to a state of the network;
responsive to detecting the change to the state of the network, updating the graph to reflect the change to the state of the network;
determining one or more paths that are potentially affected by the change to the state of the network;
determining whether to postpone recalculation of any of the one or more potentially affected paths until a second processing stage;
logging information regarding those of the one or more potentially affected paths for which recalculation is to be postponed;
recalculating any of the one or more potentially affected paths for which recalculation is not to be postponed;
during the second processing stage:
determining whether full reprocessing is to be performed; and
responsive to determining that the full reprocessing is not to be performed, recalculating, based on accessing the logged information, those of the one or more potentially affected paths for which recalculation was postponed.

2. The method of claim 1, wherein the change to the state of the network is a disabling of one or more network nodes or network links.

3. The method of claim 2, wherein the determination of whether to postpone recalculation of any of the one or more potentially affected paths is based on determining whether a number of paths affected by the disabling of the one or more network nodes or network links is above a threshold number.

4. The method of claim 1, wherein the change to the state of the network is an addition of one or more network nodes or network links.

5. The method of claim 4, wherein the determination of whether to postpone recalculation of any of the one or more potentially affected paths is based on determining whether a link capacity of a cluster is above a threshold link capacity.

6. The method of claim 4, wherein the determination of whether to postpone recalculation of any of the one or more potentially affected paths is based on determining whether a size of a cluster is above a threshold cluster size.

7. The method of claim 1, wherein the determination of whether reprocessing is to be performed is based on determining whether a current distribution of clusters is significantly different from a previous distribution of clusters.

8. The method of claim 1, further comprising:
performing the full reprocessing during the second processing stage, wherein the full reprocessing includes regrouping nodes in the graph into a plurality of clusters and recalculating intra-cluster paths and inter-cluster paths.

9. The method of claim 1, wherein the second processing stage is performed periodically.

10. The method of claim 1, wherein the resources of the network include one or more of: computational resources of network nodes, memory resources of network nodes, storage resources of network nodes, and bandwidth resources of network links.

11. A non-transitory machine-readable storage medium that provides instructions that, if executed by one or more processors of one or more computing devices, will cause said one or more computing devices to perform operations for efficiently updating information regarding resources of a network, the operations comprising:
during a preprocessing stage:
generating a graph representing resources of the network, wherein each node in the graph represents a network node and each link in the graph represents a network link;
grouping nodes in the graph into a plurality of clusters, wherein each of the plurality of clusters includes a gateway node representing the cluster;
calculating intra-cluster paths and inter-cluster paths, wherein the intra-cluster paths include paths between nodes belonging to a given cluster and the inter-cluster paths include paths between gateway nodes belonging to different clusters;
during a first processing stage:
detecting a change to a state of the network;
responsive to detecting the change to the state of the network, updating the graph to reflect the change to the state of the network;
determining one or more paths that are potentially affected by the change to the state of the network;
determining whether to postpone recalculation of any of the one or more potentially affected paths until a second processing stage;
logging information regarding those of the one or more potentially affected paths for which recalculation is to be postponed;
recalculating any of the one or more potentially affected paths for which recalculation is not to be postponed;
during the second processing stage:
determining whether full reprocessing is to be performed; and
responsive to determining that the full reprocessing is not to be performed, recalculating, based on accessing the logged information, those of the one or more potentially affected paths for which recalculation was postponed.

12. The non-transitory machine-readable storage medium of claim 11, wherein the change to the state of the network is a disabling of one or more network nodes or network links.

13. The non-transitory machine-readable storage medium of claim 12, wherein the determination of whether to postpone recalculation of any of the one or more potentially affected paths is based on determining whether a number of paths affected by the disabling of the one or more network nodes or network links is above a threshold number.

14. The non-transitory machine-readable storage medium of claim 11, wherein the change to the state of the network is an addition of one or more network nodes or network links.

15. The non-transitory machine-readable storage medium of claim 14, wherein the determination of whether to postpone recalculation of any of the one or more potentially affected paths is based on determining whether a link capacity of a cluster is above a threshold link capacity.

16. The non-transitory machine-readable storage medium of claim 14, wherein the determination of whether to postpone recalculation of any of the one or more potentially affected paths is based on determining whether a size of a cluster is above a threshold cluster size.

17. The non-transitory machine-readable storage medium of claim 11, wherein the determination of whether reprocessing is to be performed is based on determining whether a current distribution of clusters is significantly different from a previous distribution of clusters.

18. The non-transitory machine-readable storage medium of claim 11, wherein the operations further comprise:
- performing the full reprocessing during the second processing stage, wherein the full reprocessing includes regrouping nodes in the graph into a plurality of clusters and recalculating intra-cluster paths and inter-cluster paths.

19. A computing device to efficiently update information regarding a network, the computing device comprising:
- a set of one or more processors; and
- a non-transitory machine-readable storage medium containing instructions that, when executed by the set of one or more processors, causes the computing device to:
  - during a preprocessing stage:
    - generate a graph representing resources of the network, wherein each node in the graph represents a network node and each link in the graph represents a network link;
    - group nodes in the graph into a plurality of clusters, wherein each of the plurality of clusters includes a gateway node representing the cluster;
    - calculate intra-cluster paths and inter-cluster paths, wherein the intra-cluster paths include paths between nodes belonging to a given cluster and the inter-cluster paths include paths between gateway nodes belonging to different clusters;
  - during a first processing stage:
    - detect a change to a state of the network;
    - responsive to detecting the change to the state of the network, update the graph to reflect the change to the state of the network;
    - determine one or more paths that are potentially affected by the change to the state of the network;
    - determine whether to postpone recalculation of any of the one or more potentially affected paths until a second processing stage;
    - log information regarding those of the one or more potentially affected paths for which recalculation is to be postponed;
    - recalculate any of the one or more potentially affected paths for which recalculation is not to be postponed;
  - during the second processing stage:
    - determine whether full reprocessing is to be performed; and
    - responsive to determining that the full reprocessing is not to be performed, recalculate, based on accessing the logged information, those of the one or more potentially affected paths for which recalculation was postponed.

20. The computing device of claim 19, wherein the instructions, when executed by the set of one or more processors, further causes the computing device to:
- perform the full reprocessing during the second processing stage, wherein the full reprocessing includes regrouping nodes in the graph into a plurality of clusters and recalculating intra-cluster paths and inter-cluster paths.

* * * * *